Feb. 15, 1955 C. W. REENE Des.-Re. 23,944

FOLDING DOOR

Original Filed Dec. 4, 1953 2 Sheets-Sheet 1

INVENTOR.
Charles W. Reene
BY
Mann, Brown and Hanemann
ATTYS.

Feb. 15, 1955 C. W. REENE Des.-Re. 23,944

FOLDING DOOR

Original Filed Dec. 4, 1953 2 Sheets-Sheet 2

INVENTOR.
Charles W. Reene
BY
Mann, Brown and Hanemann
ATTORNEYS.

United States Patent Office

Des. Re. 23,944
Reissued Feb. 15, 1955

23,944

FOLDING DOOR

Charles William Reene, Janesville, Wis., assignor to The Hough Shade Corporation, Janesville, Wis., a corporation of Connecticut Original No. 172,647, dated July 13, 1954, Serial No. 27,931, December 4, 1953, for 14 years. Application for reissue July 27, 1954, Serial No. 31,636. Term of patent 14 years (Cl. D13—1)

Matter enclosed in heavy brackets [ ] appears in the original patent but forms no part of this reissue specification; matter printed in italics indicates the additions made by reissue.

To all whom it may concern:

Be it known, that I, Charles W. Reene, a citizen of the United States and a resident of Janesville, in the county of Rock and State of Wisconsin, have invented a new, original, and ornamental Design for a Folding Door of which the following is a specification, reference being had to the accompanying drawings forming part thereof.

Figure 1:
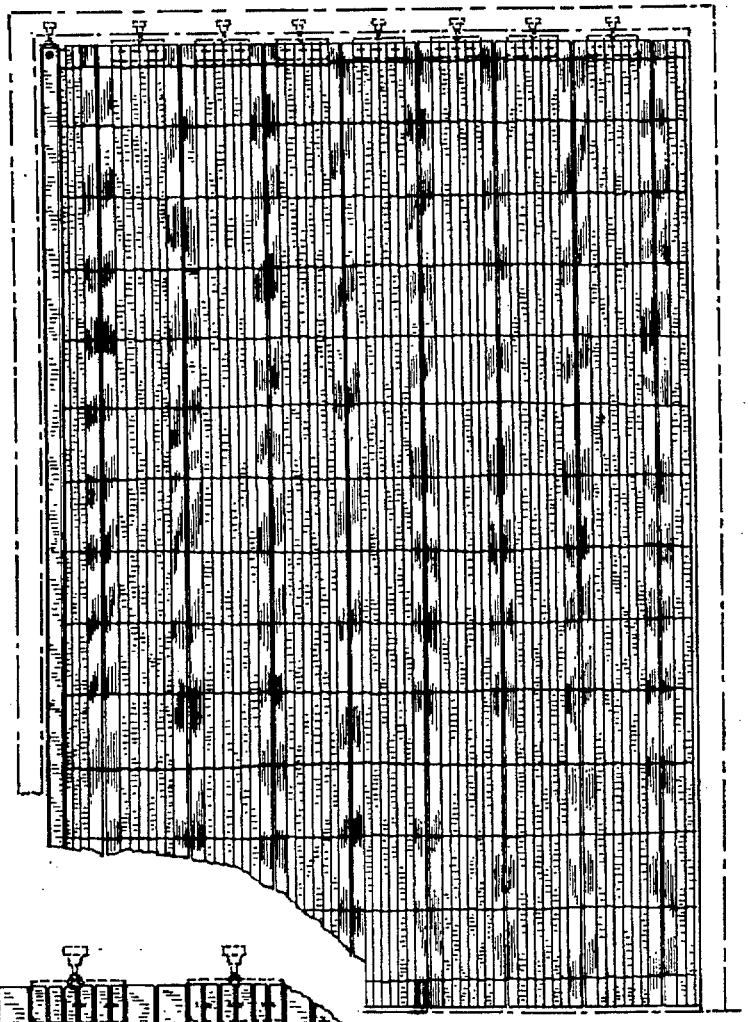

Fig. 1 is a front *elevational* view *of a folding door*

*showing my new design, with a portion of the bottom left corner broken away for convenience of illustration;*

Figure 2:
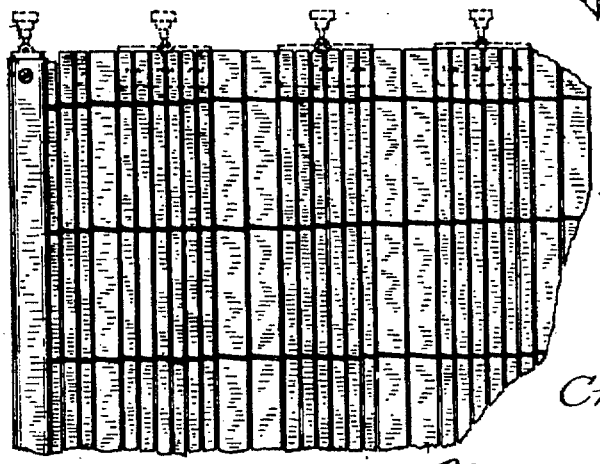
Figure 3:
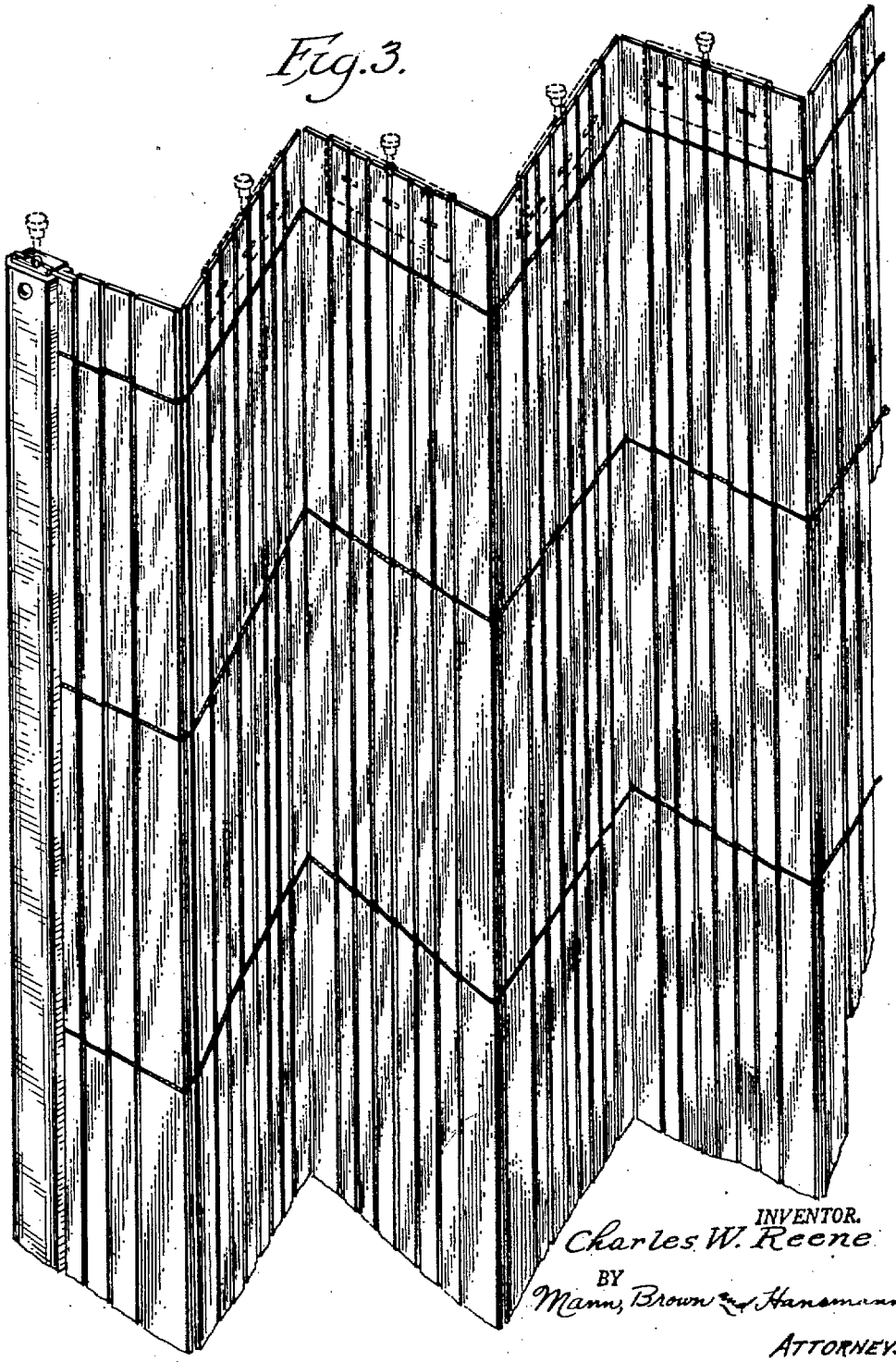

Fig. 2 is an enlarged fragmentary section *of the upper portion of the door;* and Fig. 3 is a *fragmentary* perspective view *thereof.*

The broken lines shown in Fig. 1 are for illustrative purposes only, *and the dominant features of my design reside in the portions shown in full lines.*

The characteristic feature of my design consists in the use of a plurality of relatively narrow contiguous *vertical* slats separated by one or more relatively wide *vertical* slats.

I claim:

The ornamental design for a folding door, substantially as shown and described.

References Cited in the file of this patent or the original patent

UNITED STATES PATENTS

| | | |
|---|---|---|
| 571,988 | Bayer | Nov. 24, 1896 |
| 1,218,556 | Hough | Mar. 6, 1917 |

FOREIGN PATENTS

| | | |
|---|---|---|
| 43,397 | Austria | Aug. 10, 1910 |
| 467,979 | France | Apr. 9, 1914 |

OTHER REFERENCES

House and Garden, May 1952, page 251, top right illustration.